(12) United States Patent
Bielicki et al.

(10) Patent No.: US 6,726,012 B2
(45) Date of Patent: Apr. 27, 2004

(54) MANUFACTURING A TIRE TRACKING IDENTIFICATION UNIT

(75) Inventors: Thomas M. Bielicki, Trumbull, CT (US); Mark Stephen Bielicki, Ridgefield, CT (US)

(73) Assignee: Tracking Systems LLC, Ridgefield, CT (US)

( * ) Notice: Subject to any disclaimer, the term of this patent is extended or adjusted under 35 U.S.C. 154(b) by 71 days.

(21) Appl. No.: 10/132,359

(22) Filed: Apr. 25, 2002

(65) Prior Publication Data

US 2003/0201202 A1 Oct. 30, 2003

(51) Int. Cl.⁷ .......................... B65D 85/62; B60C 13/00
(52) U.S. Cl. ...................... 206/389; 206/459.5; 40/587; 152/524; 156/116
(58) Field of Search ................. 152/450, 524; 156/116, 272.8; 206/232, 389, 459.5, 526, 820; 40/587

(56) References Cited

U.S. PATENT DOCUMENTS

| | | | | |
|---|---|---|---|---|
| 4,256,159 A | * | 3/1981 | Williams | 152/524 |
| 5,061,341 A | * | 10/1991 | Kildal et al. | 216/65 |
| 5,474,645 A | * | 12/1995 | Bohm et al. | 156/395 |
| 5,478,426 A | * | 12/1995 | Wiler et al. | 156/272.8 |
| 5,603,796 A | * | 2/1997 | Baker | 156/272.8 |
| 5,824,397 A | * | 10/1998 | Koops et al. | 428/207 |
| 5,910,567 A | * | 6/1999 | Tanaka et al. | 528/491 |
| 6,169,266 B1 | * | 1/2001 | Hughes | 219/121.68 |
| 6,230,780 B1 | * | 5/2001 | Rietheimer | 156/577 |
| 6,583,097 B2 | * | 6/2003 | McDonald | 510/365 |
| 2002/0051930 A1 | * | 5/2002 | Ozawa et al. | 430/270.1 |

* cited by examiner

*Primary Examiner*—Jim Foster
(74) *Attorney, Agent, or Firm*—Notaro & Michalos P.C.

(57) ABSTRACT

A weather and wear resistant rubber ID unit for a tire with a selected pattern on the ID unit is made by scanning a outer layer of the rubber unit with a laser beam from a high powered $CO_2$ laser operated at a less than full power output, to ablate the outer layer in the form of the selected pattern, to expose an inner layer of the unit which has a contrasting color. Loose and residue particles are removing using a vacuum and a cleaning fluid contain alcohol and a surface active agent such as soap. The fluid is rinsed away and the unit is dried for use.

6 Claims, 2 Drawing Sheets

MANUFACTURING A TIRE TRACKING IDENTIFICATION UNIT

FIELD AND BACKGROUND OF THE INVENTION

The present invention relates generally to the field of marking rubber articles, and in particular to a new and useful laser-assisted method of cutting a selected pattern into a multi-layered workpiece, unit or patch, and to the resulting product itself.

Tires are a source of high operating costs for most common carriers regardless of what they are shipping or carrying. A system is needed for tracking tire maintenance and predicting the life of a tire, as a preventative step for avoiding tire failures and reducing emergency roadside repair. Therefore, a system is needed for properly maintaining and managing tires, in particular commercially used tires, from the time a tire is born to the time that its usefulness ends. To this end, each tire must be provided with a unique and permanent identification mark that will always be accurately recognizable regardless of the normal wear and tear of the tire.

Several methods for marking rubber are known in the art, but do not have the permanence and accuracy that is needed for adequately managing and tracking a tire. For example, it is known in the art of marking rubber that a $CO_2$ laser can be used to cut a rubber work piece. An important area of industrial application for $CO_2$ lasers has been in cutting, marking, engraving, etching, trimming and perforating rubber items.

U.S. Pat. No. 5,478,426 to Wiler et al. discloses a method for ablating elastomeric materials with a laser to produce a pattern or design within the elastomeric material. The Wiler et al. patent requires an elastomeric multilayered work piece, having a first outer layer with a higher ablation rate than a second inner layer. As a result, the inner layer has a lower response to the laser, and any inadvertent impingement of the laser on the inner layer will not disturb or damage the inner layer. On the other hand, the multi-layered workpiece, unit or patch of the present invention preferably has an outer layer with a lower ablation rate than the inner layer or a substantially similar ablation rate to the inner layer.

The Wiler et al. patent also teaches the use of two different types of lasers (e.g., a YAG and a $CO_2$ laser) to cut different layers, but does not teach the use of a single full-powered $CO_2$ laser set to reduced power output to cut a single layer of rubber. There are significant differences between a YAG and $CO_2$ laser, including wavelength of the emitted light, beam shape, beam delivery, and power. In particular, a YAG laser is a solid state laser emitting a light at a wavelength of 1.06 microns near infrared while a $CO_2$ gas laser emits a light at a wavelength of 10.6 microns or mid-IR. A $CO_2$ laser is therefore absorbed differently by rubber than a YAG laser.

The Wiler et al. patent also does not teach cleaning the area of the cut pattern with a cleansing fluid.

U.S. Pat. No. 5,880,430 to Wein discloses a method and apparatus for laser etching a design into a workpiece with the assistance of a computer. The computer may be used to select the operation parameters for the laser such as laser beam intensity and the desired pattern or design.

In one embodiment of the Wein patent, a first material base, that is not easily engravable by a laser, lies beneath a second material that is easily engravable with a laser. The laser etches the preselected design into the second material until it reaches the interface between the two materials. Multiple color or multiple layer designs may be formed from the removal of different portions of a layer. Although the patent discloses rubber as one type of material that is suitable for this process, the first layer must be a different material from the second layer. The Wein patent also does not teach a full powered $CO_2$ laser operating at reduced power or a cleaning agent.

Also see U.S. Pat. No. 2,985,216 to Williams et al. and U.S. Pat. No. 5,061,341 to Kildal et al.

The prior art does not provide a method for marking a multi-layered and multi-colored rubber patch with a full powered $CO_2$ laser that is operated at less than its full power capability and scans the rubber unit with a preselected pattern or design before ablating an outer layer to reveal inner layer portions of contrasting color. Furthermore, the prior art does not teach marking of a multi-layered rubber unit that comprises layers of the same type of material (e.g., rubber), but has an outer layer with a lower ablation rate (i.e. is more difficult to ablate) than the inner layer for ensuring durability and wear and tear protection for the resulting pattern for maintaining accuracy and recognition. Finally, the prior art does not teach the use of a cleaning agent containing a surface active agent and a solvent such as alcohol, for removing rubber residue from the unit.

SUMMARY OF THE INVENTION

It is an object of the present invention to provide a method for manufacturing a weather and wear resistant rubber identification unit for a tire with a selected pattern on the unit, and an identification unit made by that method.

The unit can be used as part of a tire tracking, inventory and use system. To this end the unit must be economical to make and extremely resistant to wear and weathering, while being marked with individual, unique and serialized patterns, such as a bar code. This is particularly true where the system is used for truck tires.

Accordingly, another object of the invention is to provide a multi-layered rubber identification or ID unit having an outer layer of one color and at least one inner layer of a contrasting color, scanning the outer layer of the unit with a laser beam from a high powered $CO_2$ laser operated at less than full power output, to ablate the outer layer in the form of the selected pattern, to expose the at least one inner layer of contrasting color, the ablating step forming loose particles and residue particles, removing the loose particles from the unit using a vacuum and applying a cleaning fluid to the ID unit remove the residue particles from the unit.

The invention also includes using a cleaning fluid that contains solvent, such as alcohol and a surface active agent for reducing a tendency of the alcohol to evaporate, the method including rinsing the cleaning fluid from the unit and then drying the unit.

The alcohol is of the type know for use as a propellant and the surface active agent is a soap in the preferred form of the invention. Commercially available products know by the trademarks "Spray n' Wash" and "Scrubbing Bubbles" both in aerosol form, have been found to be good cleaning agents.

The preferred form of the laser is a commercially available 100 Watt $CO_2$ it was found that operating the laser at less than full power, e.g. at 30–40% less than full power, specifically at 60 watts or 60% power, ablated the outer ID unit layer more fully and evenly than a 60 watt laser of similar type. This also allows the laser beam to be scanned over the ID unit in one pass and quickly, to make the pattern quickly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
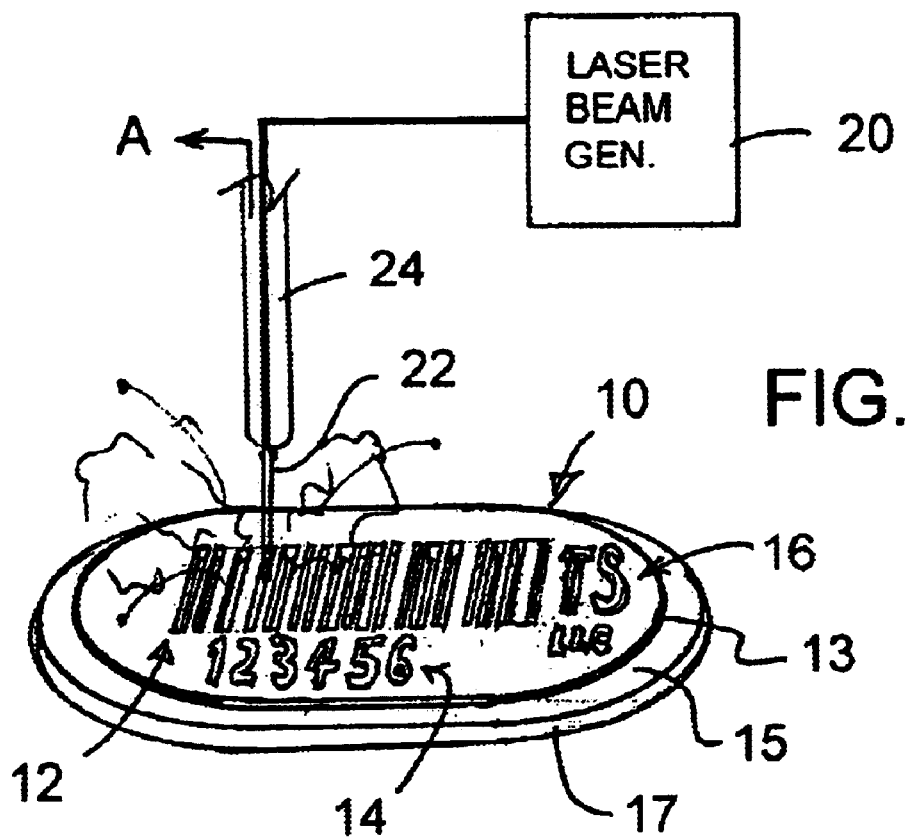
FIG. 1 is a schematic illustration of the apparatus needed for performing the laser cutting step according to the method of the invention.

Referring now to the drawings, in which like reference numerals are used to refer to the same or functionally similar parts, FIG. 1 shows the apparatus needed for performing the ablation or pattern cutting step of the invention. The method is for manufacturing a weather and wear resistant rubber ID unit 10 for a tire (not shown) with a selected pattern on the ID unit, such as serialized information such as a bar code 12 and associated numbers 14, and/or unserialized information like a company logo 16.

The method starts by providing the multi-layered rubber ID unit 10 which has an outer layer 13 of one color, e.g. white, and at least one inner layer 15 of a contrasting color, e.g. black. There is also a another bottom layer 17 beneath inner layer 15, which acts as a bonding layer between the ID unit and a tire.

A 100 watt $CO_2$ laser beam generator or power supply 20 was found to work best, at less than full power, e.g. at 40 to 80% power, preferably 55 to 65% and even more preferably at 60 watts output. The power supply creates a laser beam 22 that is scanned using known beam scanning equipment 24, over the surface of the ID unit 10.

The ID unit is thus scanned with the laser beam 22 to ablate the outer layer 13 in the form of the selected pattern 12,14,16, to expose the inner layer 15 of contrasting color. The ablation forms loose particles and residue particles that fly from or adhere to the ID unit. The loose particles are drawn away in the direction of arrow A, from around the impact point of the beam 22, by a vacuum system that is part of the commercially available laser used. Sharp and deep grooves of the pattern are thus cut through the full thickness of the white top layer 13 and corresponding black grooves in the inner layer 15 are thereby made visible. At this stage, however, the ID unit is very dirty with the residual or residue particles.

Figure 2:
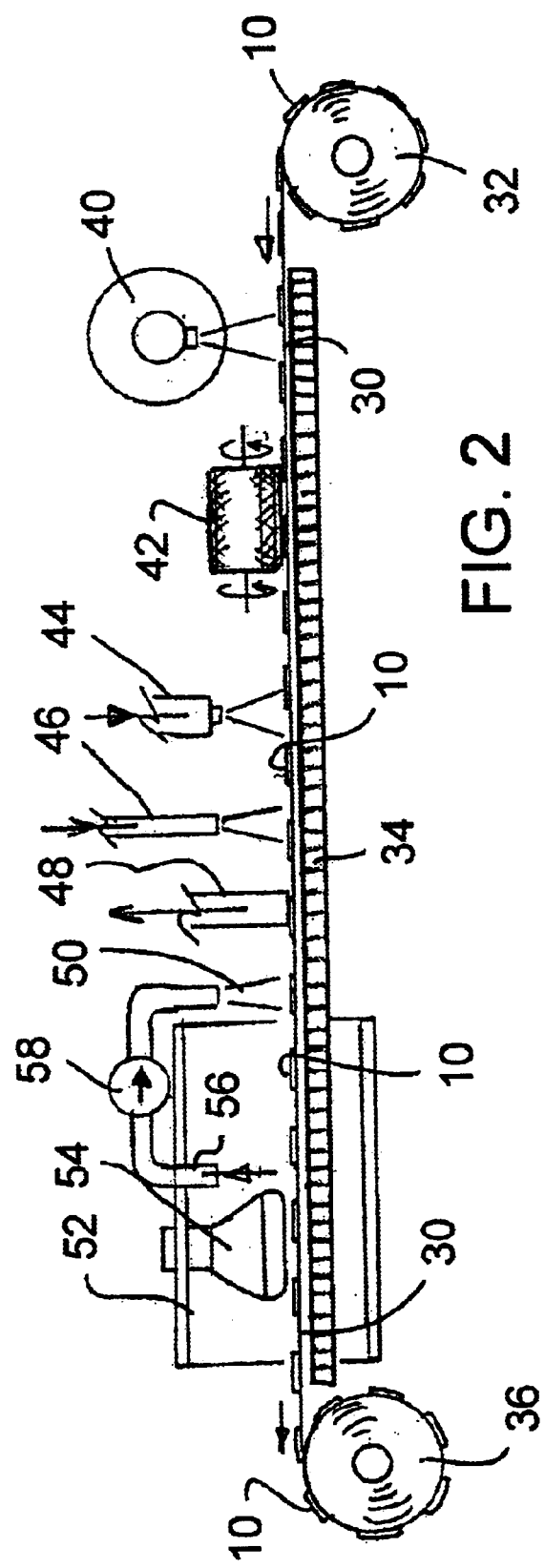
FIG. 2 is a schematic illustration of the apparatus for cleaning the multilayered ID unit according to the method of the invention.

Removal of the residue particles from the ID unit 10 is achieved using the apparatus of FIG. 2.

After the pattern is formed, a plurality of the units 10 are applied to and spaced along a carrier strip 30 and rolled onto a "dirty" roll 32. The strip 30 with units 10 is passed over a perforated work table 34 and after being cleaned according to the present invention, is collected on a "clean" roll 36 for storage and eventual use.

A cleaning fluid, preferably aerosol known by the trademarks "Spray n' Wash" or "Scrubbing Bubbles," is sprayed onto each ID unit by a cleaning fluid dispenser 40, as the carrier strip 30 moves under the dispenser, to start the removal of the residue particles from the ID unit. The cleaning fluid contains a solvent, e.g. alcohol, and in particular propellant alcohol, with a surface active agent such as soap, for reducing a tendency of the alcohol to evaporate.

The cleaning step was attempted with various pure alcohols which were believed to be similar to the operative ingredient of the cleaning fluid. The alcohols evaporated too quickly, however, to achieve the cleaning function. A subsequent scrubbing step of the invention, using a reciprocating brush 42 brushing perpendicularly across the top of the units, which is needed to clean the units, could not be performed before all of the alcohol had evaporated.

It is believed that soap with the alcohol in the cleaning fluid of the invention acts as a surface active agent to keep the alcohol from evaporating. To test this theory, alcohol with soap was used but the results were only partly satisfactory since excessive rinsing in subsequent steps of the invention, was needed to remove the soap.

The method performed with the preferred cleaning fluid, includes rinsing the units with a pressure spray of water at 44, after the scrubbing step at 42. Compressed air at ambient temperature is then sprayed across the surface of the units at 46 to remove much of the water from the units and carrier. The perforated table 34 allows all of the waste fluids to leave the immediate area of the carried and units 30,10.

The units are then past close under a vacuum head 48 which is useful to remove water that has puddled in the grooves of the pattern. The units then move under a blast of warm air at 50 to start a drying process of the invention.

Downstream of air blast 50, the carrier and units move into a tunnel 52 containing a heating lamp 54 that is about 1–4 (preferably 2–3) inches over the units in the tunnel. This finally and fully dries the units but without fully curing the semi-cured ID unit layers that are needed to properly attach the ID units to a tire. To this end, the inlet for warm air blast 50 is provided at 56, near the heating lamp and the warm air is circulated to the air blast by a blower 58. This advantageously warms and drys the units but keeps then from becoming over heated in tunnel 52.

Rinsing at 44 may be performed with a standard pressure washer. Compressed air at 46 blows off the water and the loosened residue.

The unit or patch 10 is supplied by Patch Rubber Company/Myers Industries, Inc. of Roanoke Rapids, N.C. As shown in FIG. 1, the unit or patch comprises an outer layer 13 of high durometer rubber material that is preferably 0.5 mm thick, but may be between 0.4 and 0.7 mm thick at a maximum. The term durometer is used in the art to signify a measurement of the hardness of a rubber material. A higher durometer will be more durable than a lower durometer product. In addition, a higher durometer rubber has a lower ablation rate than a lower durometer rubber. The outer layer 13 is preferably white to contrast other layers within the unit or patch.

The ID unit 10 also comprises the inner layer 15, which is preferably 1 mm thick, but may be between 0.8 and 1.5 mm thick. The inner layer 15 is also a rubber material with a lower durometer than the outer layer 13. Therefore, in the preferred embodiment, the ablation rate of the outer layer is lower than the ablation rate of the ablation rate of the inner layer 15. This has been confirmed by experiments that used the same laser 20 in a first and second pass to cut a first and second trough or groove into the ID unit. If the outer layer 13 had a greater ablation rate than the inner layer 15, the depth of the first pass would have been slightly less than that of the second pass. However, if the outer 13 layer had a lower ablation rate than the inner layer 15, the depth of the second pass would be more than twice that of the first pass.

According to the results, the second pass cut a depth into the ID unit that was on an average more than twice the depth cut by the first pass. In particular, the average depth in millimeters for the first pass was 0.63 and the average depth for the second pass was 1.39.

Alternatively, the outer layer 13 may also have durometer properties comparable to the inner layer 15, and therefore, have an ablation rate when scanned by the laser beam 22 which is at most substantially the same as the ablation rate of the inner layer 15. This still means that the outer layer 13 is ablated less easily than the inner layer 15, or that the ablation rates are about the same.

An outer layer with an ablation rate that is higher than that of the inner layer would result in the easy wearing away of the outer layer. An outer layer with a lower ablation rate than the inner layer has the advantages of providing durability for the engraved pattern and takes away the need for using more than one laser as in the Wiler et al. patent.

The inner layer 15 is preferably a black contrast to the white outer layer 13. In addition, the inner layer 15 may also serve to block ultraviolet light that may cause staining of the outer white layer. For this reason the ID unit 10 also comprises a bottom layer 17, which is a semi-cured gum rubber used as a bonding layer between the ID unit 10 and a tire. The bottom layer 17 is preferably 0.1 mm thick but may be as thick as 0.4 mm.

Alternatively, the ID unit 10 may also have other layers between the inner layer 15 and the bottom layer 17 which assist in blocking active oxidants in tires from blackening or browning the white outer layer 13. These additional layers are preferably black and 1 mm thick. However, they may be as thick as 1.5 mm.

"Spray n' Wash" aerosol cleaning fluid contains: detergent agents acting as surfactants; solvents; stabilizers; fragrance; and water. "Scrubbing Bubbles" aerosol cleaning fluid contains: n-Alkyl (60% C14, 30% C16, 5% C18) methyl benzyl ammonium chlorides . . . 11%; n-Alkyl (68% C12, 32% C14) dimethyl ethylbenzyl ammonium chlorides . . . 11%; and an aqueous solution of detergents, cleaners, chelants and perfumes . . . 99.78%; with 6% hydrocarbon propellant.

While specific embodiments of the invention have been shown and described in detail to illustrate the application of the principles of the invention, it will be understood that the invention may be embodied otherwise without departing from such principles.

What is claimed is:

1. A reel of weather and wear resistant rubber identification units for tires, with a selected pattern on each unit, made by the process comprising:

provingding a plurality of multi-layered rubber units each having an outer layer of one color and an inner layer of a contrasting color;

exposing the outer layer of each rubber unit to a laser beam of a high powered $CO_2$ laser and manipulating the laser beam to form the selected pattern by ablation, which pattern comprises sharp and deep grooves of the pattern cut through a full thickness of the outer layer so that the inner layer becomes visible to form the selected pattern, the outer layer having a lower ablation rate to the laser beam than the inner layer;

removing loose particles from the units with a vacuum;

affixing a plurality of such units in a series to a reel;

subjecting the reel of units to a cleaning fluid in the form of an aerosol spray containing alcohol and soap to remove residue particles from the units;

rinsing away the cleaning fluid from the reel of units; and drying the reel of units.

2. A reel of units according to claim 1, wherein the high powered $CO_2$ laser is a 100 watt laser, the process including operating the laser at about 55 to 65% of full power output.

3. A reel of units according to claim 1, including scrubbing the reel of units with the cleaning fluid.

4. A reel of units according to claim 1, wherein the selected patterns ablated into the units are serialized and the units are affixed to the reel in series according to the serialized patterns.

5. A weather and wear resistant rubber unit for a tire with a selected pattern on the unit, made by the process comprising the steps of:

providing a multi-layered rubber unit having an outer layer of one color and an inner layer of a contrasting color;

exposing the outer layer of the rubber unit to the laser beam of a high powered $CO_2$ laser operated at a less than full power output and manipulated the beam to form the selected pattern, the outer layer having a lower ablation rate to the laser beam than the inner layer;

removing loose particles from the unit with a vacuum system;

spraying the unit with an cleaning fluid;

scrubbing the unit with cleaning fluid thereon to remove residue particles from the unit;

rinsing the cleaning fluid and residue particles from the unit with pressurized water; and drying the unit by blowing the water off the unit with compressed heated air.

6. A unit according to claim 5, wherein the high powered $CO_2$ laser is a 100 watt laser, the precess including operating the laser at about 55 to 65% of full power output, the cleaning fluid being an aerosol alcohol containing fluid.

* * * * *